United States Patent
Chang et al.

(10) Patent No.: US 7,592,971 B2
(45) Date of Patent: *Sep. 22, 2009

(54) LARGE SIZE TILED DISPLAY DEVICE

(75) Inventors: Youn-Gyoung Chang, Dongan-Gu (KR); Min-Joo Kim, Yangpysong 3-Ga (KR)

(73) Assignee: LG. Display Co., Ltd., Seoul (KR)

( * ) Notice: Subject to any disclaimer, the term of this patent is extended or adjusted under 35 U.S.C. 154(b) by 683 days.

This patent is subject to a terminal disclaimer.

(21) Appl. No.: 11/152,953

(22) Filed: Jun. 14, 2005

(65) Prior Publication Data

US 2006/0007054 A1    Jan. 12, 2006

(30) Foreign Application Priority Data

Jun. 22, 2004    (KR) .................. 10-2004-0046694

(51) Int. Cl.
*G09G 5/00* (2006.01)
(52) U.S. Cl. .................. 345/1.3; 345/690; 345/694
(58) Field of Classification Search .................. 345/1.3, 345/690, 694
See application file for complete search history.

(56) References Cited

U.S. PATENT DOCUMENTS

| | | | |
|---|---|---|---|
| 6,892,014 B2* | 5/2005 | Cok et al. | 385/120 |
| 7,228,051 B2* | 6/2007 | Cok et al. | 385/146 |
| 2004/0234163 A1* | 11/2004 | Lee et al. | 382/298 |

* cited by examiner

*Primary Examiner*—Richard Hjerpe
*Assistant Examiner*—Leonid Shapiro
(74) *Attorney, Agent, or Firm*—Brinks Hofer Gilson & Lione

(57) ABSTRACT

A large size tiled display device includes a plurality of display panels having an image display part including a plurality of pixels. Each pixel includes at least three sub-pixels. A frame has a plurality of panel receiving portions to receive the plurality of display panels. The frame has an outer wall frame and a partition wall frame, each of which has a vertical surface and an inclined surface extending from the vertical surface that tapers the frame. A light guide plate is formed of a cluster of optical fibers. The light guide plate is disposed on the display panels to reproduce an image formed on the image display part of the display panels. Each optical fiber corresponds to one sub-pixel.

14 Claims, 6 Drawing Sheets

LARGE SIZE TILED DISPLAY DEVICE

CLAIM FOR PRIORITY

This application claims the benefit of priority to Korean Patent Application No. 2004-46694, filed on Jun. 22, 2004 which is hereby incorporated by reference as if fully set forth herein.

FIELD OF THE INVENTION

The present invention relates to a large size display device, and particularly, to a large size tiled display device capable of preventing a seam phenomenon and improving light transmittance efficiency.

DESCRIPTION OF THE RELATED ART

In general, the importance of an electronic display device is increasing as a visual information transmitting device and the electronic display device enlarges the scope of industry with the implementation of an information society. Diversification of information, represented by term 'multimedia', makes the usefulness of the electronic display device clearer. Simultaneously, the demand for an electronic display device having a large screen, providing a high quality image and good visibility and being economical is also increasing. Particularly, it is desirable for portable information devices to have low power consumption.

A liquid crystal display (LCD) device is one of the electronic display devices and is thin, light and consumes low power. Because of such characteristics, the LCD device has an increasing application market, and the demand thereof is rapidly increasing because of color display. Also, as the standard of living of consumers is improved, a product having a bigger size and better image quality is demanded. Therefore, faculties for establishing technologies to mass-produce a color liquid crystal display device with a large screen are desired.

The color LCD device with a large screen has a limit in a screen size, and a maximum panel size which has been known so far is 22 inches, and it is known that 40-inch panel may be produced theoretically.

Thus, what is called a projection TV having an optical system with a small panel to form a large image on a screen has emerged. However, despite such development, a limit in implementing a large screen still exists. For this reason, a tiled liquid crystal display device in which several liquid crystal panels are tiled to form a large size display device is being put to practical use.

FIG. 1 is a structural view which illustrates a tiled LCD device.

As shown, the tiled LCD device 10 is formed by fixing a plurality of liquid crystal panels 30a~30d on a frame 20. Here, each of the liquid crystal panels 30a~30d may form one unit as a backlight assembly, a liquid crystal plate, a liquid crystal layer and polarization members are attached thereto. The frame 20 includes an outer wall frame 20a forming an outer wall, a partition wall frame 20b interposed between panels and a bottom plate 20c which the panels 30a~30d are put on. Here, each of the panels 30a~30d is received in a space formed by the partition wall frame 20b and the outer wall frame 20a and is tiled.

In a method of constructing a large screen using the tiling technology, because an image is not formed at the partition wall frame 20b, a seam phenomenon occurs in that a boundary line is displayed on the screen corresponding to the partition wall frame 20b. Thus, an entirely-unified image cannot be displayed.

SUMMARY OF THE INVENTION

By way of introduction only, in one aspect, a tiled display device comprises a plurality of display panels having an image display part including a plurality of pixels. Each pixel includes at least three sub-pixels. A frame has a plurality of panel receiving portions to receive the plurality of display panels. A light guide plate comprises optical fibers. The light guide plate is disposed on the display panels to reproduce an image formed on the image display part of the display panels. Each optical fiber corresponds to one sub-pixel.

In another aspect, a tiled display device comprises a plurality of display panels having an image display part including a plurality of pixels. Each pixel includes four sub-pixels of the same area. A frame has a plurality of panel receiving portions to receive the plurality of display panels. A light guide plate comprises optical fibers. The light guide plate is disposed on the display panels to reproduce an image formed on the image display part of the display panels. Each optical fiber corresponds to one pixel.

In another aspect, a tiled display device comprises a plurality of display panels having an image display part including a plurality of pixels. Each pixel includes a plurality of sub-pixels. A frame has a plurality of panel receiving portions to receive the plurality of display panels. The frame has an outer wall frame and a partition wall frame. An inner side of the outer wall frame includes a vertical surface formed to a certain height and an inclined surface extending outward from the vertical surface. The partition wall frame has vertical surfaces formed at both sides to the certain height and inclined surfaces extending inward from the vertical surfaces. A plurality of light guide plates is mounted in the panel receiving portions.

To achieve these and other advantages and in accordance with the purpose of the present invention, as embodied and broadly described herein, there is provided a large size tiled display device comprising: a plurality of display panels having an image display part including a plurality of pixels, each pixel including first~ fourth sub-pixels; a frame having a plurality of panel receiving portions to receive the plurality of display panels; and a light guide plate formed of a cluster of optical fibers and disposed on the display panels to reproduce an image formed on the image display part of the display panels, one optical fiber corresponding to one pixel, wherein the four sub-pixels defining the pixel have the same area.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
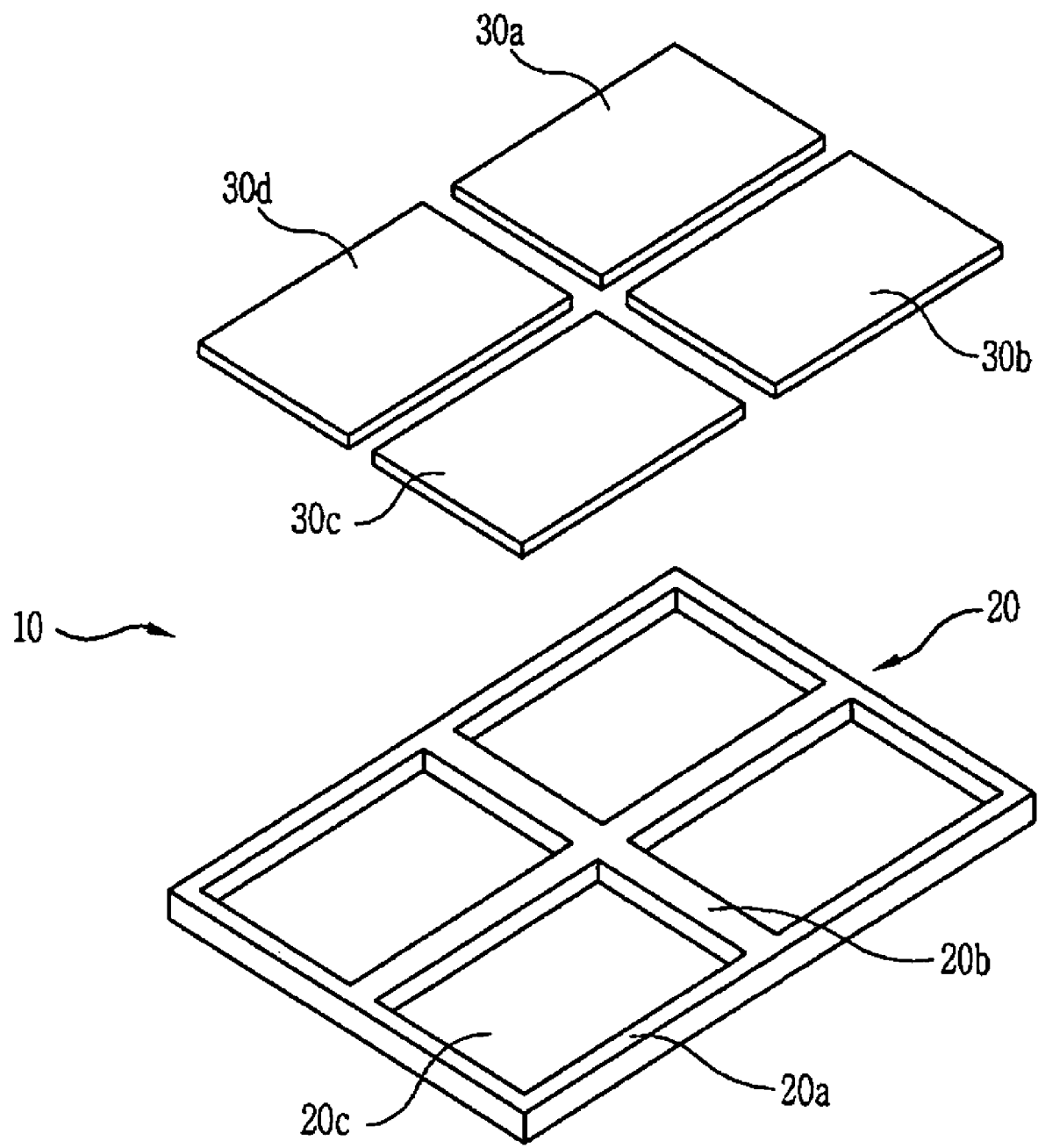
FIG. 1 is a structural view which illustrates a related tiled LCD device.
Figure 2:
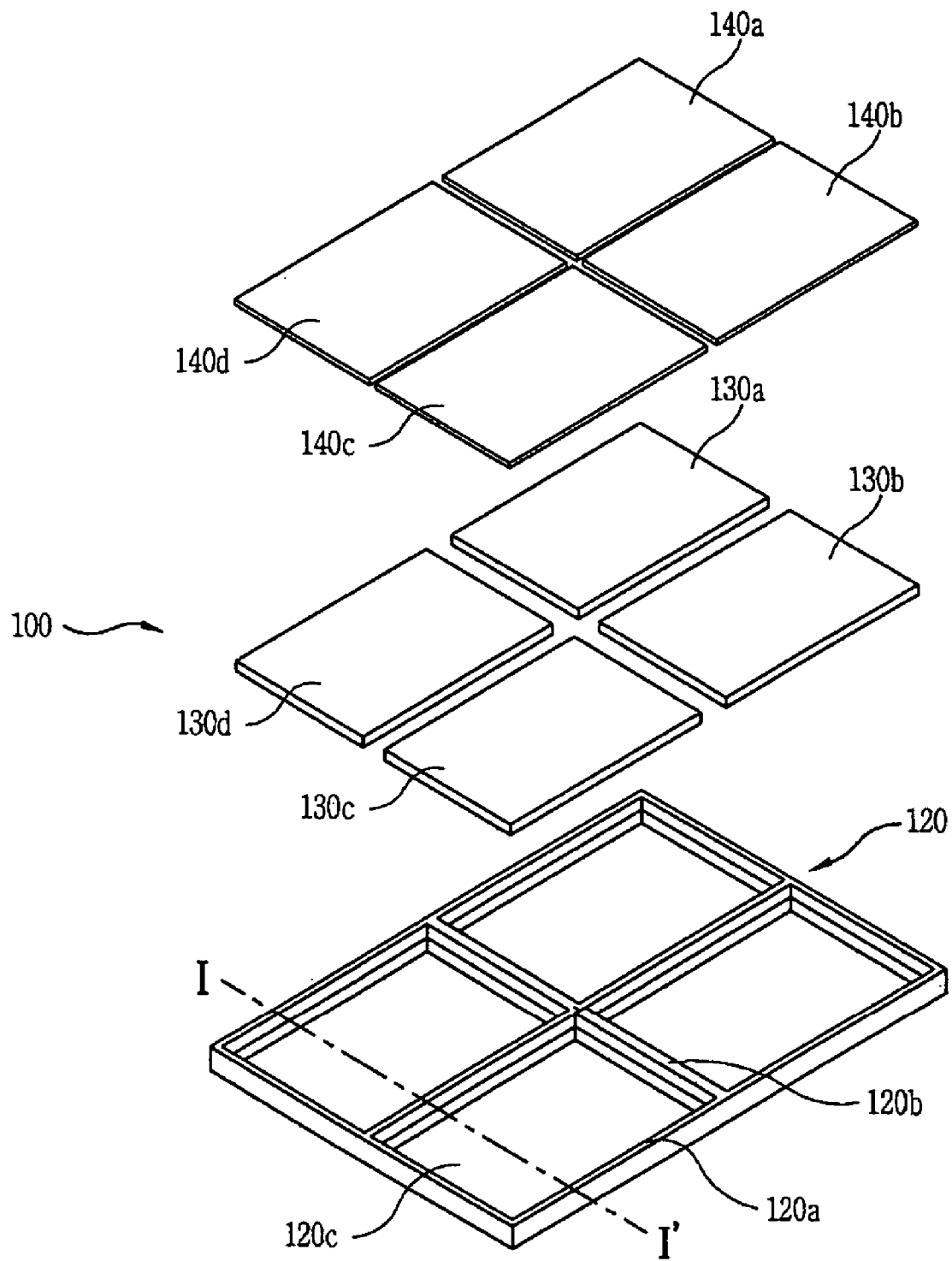
FIG. 2 is a structural view which illustrates a large size tiled display device in accordance with the present invention.
Figure 3:
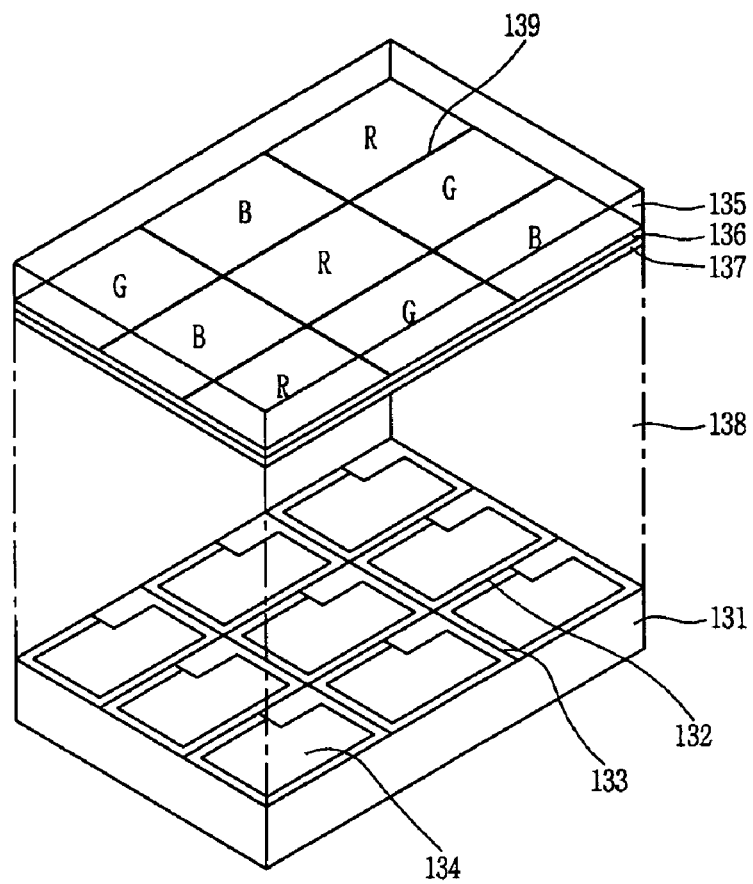
FIG. 3 is a structural view which illustrates a liquid crystal panel.
Figure 4:
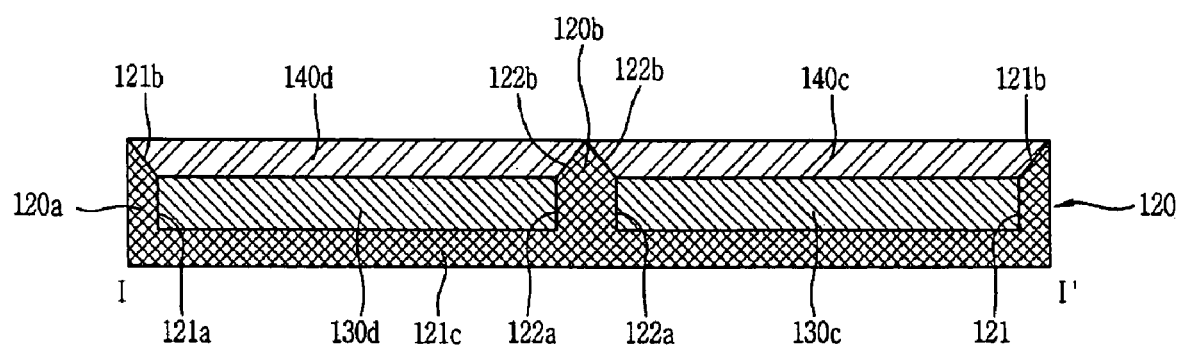
FIG. 4 is a sectional view taken along line I-I' of FIG. 2.

FIG. 2 is a schematic exploded perspective view which illustrates a tiled display device in accordance with the present invention, FIG. 3 is a view which illustrates a display panel (liquid crystal panel) in detail, and FIG. 4 is a sectional view taken along line I-I' of FIG. 2.

As shown in FIG. 2, the tiled display device 100 is formed by fixing to a frame 120, a plurality of display panels 130a~130d and light guide plates 140a~140d respectively formed on the display panels 130a~130d. Here, as the display panel 130a~130d, a liquid crystal display panel (LCD), a field emission display panel (FED), a plasma display panel (PDP), an electroluminescence (EL) or the like may be used.

Particularly, as shown in FIG. 3, if the display panels 130a~130d are liquid crystal panels, each of the display panel 130 includes a first substrate 131, a second substrate 135 and a liquid crystal layer 138 formed between the first and second substrates 131 and 135.

The first substrate 131, a thin film transistor array substrate, includes gate lines 133 and data lines 132 that define a plurality of pixel regions. A switching device (not shown) for switching each pixel is formed at each of regions where the gate lines and the data lines 132 intersect each other, and a pixel electrode 134 for driving a liquid crystal is formed at the pixel region.

The second substrate 135, a color filter substrate, includes a color filter layer 136 for implementing actual colors and a black matrix 139 for preventing light leakage between the pixels. Here, the color filter layer 136 is formed such that red, green and blue (R, G and B) color filters are disposed in regions corresponding to the pixel regions, respectively. Also, a common electrode 137 for driving the liquid crystal together with the pixel electrode 134 is formed on the color filter layer 136.

Here, although not shown in the drawing, the common electrode 137 and the pixel electrode 134 may be formed on the same plane (e.g., on the first substrate). If the common electrode 137 and the pixel electrode 134 are formed on the same substrate, a viewing angle may be improved by horizontal driving of the liquid crystal.

Referring to FIG. 2 again, as for the tiled display device in accordance with the present invention, the frame 120 includes an outer wall frame 120a forming an outer wall, a partition wall frame 120b interposed between panels and a bottom plate 120c which the panels 130a~130d and the light guide plates 140a~140d can be put on. Here, each of the display panels 130a~130d is received in a space formed by the partition wall frame 120b and the outer wall frame 120a and is tiled.

As shown in FIG. 4, an inner side of the outer wall frame 120a includes a vertical surface 121a formed to a certain height and an inclined surface 121b upwardly extending from the vertical surface 121a. The inclined surface 121b is formed inclined such that a thickness of the outer wall frame 120a gets narrower in an upward direction, the vertical surface 121a corresponds to a side portion of the display panel 130c, 130d, and the inclined surface 121b corresponds to an inclined surface formed at a side portion of the light guide plate 140c, 140d. Also, vertical surfaces 122a are formed at both sides of the partition wall frame 120b to a certain height, and inclined surfaces 122b upwardly extend from the vertical surfaces 122a. Here, each of the inclined surfaces 122b is inclined such that the partition wall frame 120b gets narrower in an upward direction.

Also, inclined surfaces are formed at side portions of the light guide plates 140c and 140d, to meet the inclined surfaces 121b and 122b of the partition wall frame 120b and the outer wall frame 120a. Here, the inclined surfaces of the light guide plates 140c and 140d are inclined corresponding to the inclined surfaces of the frames.

Figure 5:
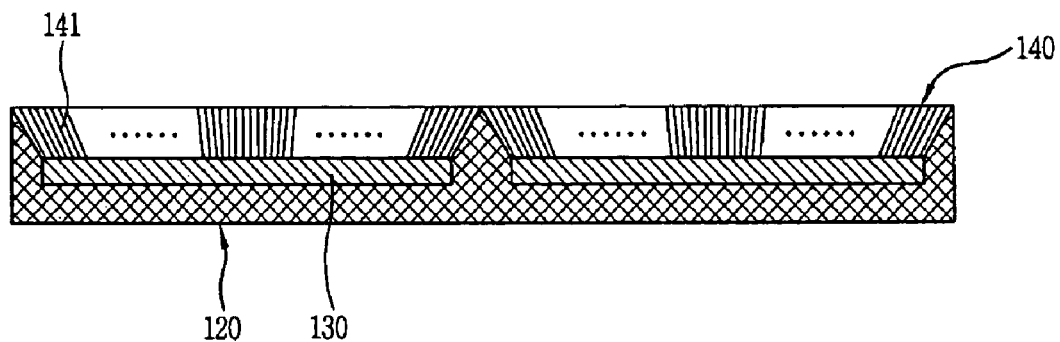
FIG. 5 is a view which illustrates a light guide plate.

As shown in FIG. 5, the light guide plate 140 is formed of a cluster of optical fibers 141. The optical fibers 141 are distributed over an entire upper surface of the display panel 130 such that one set of ends form a lower surface of the light guide plate 140 and the opposing set of ends form an upper surface of the light guide plate 140. Here, because the upper surface of the light guide plate 140 has a larger area than that of the lower surface, the optical fibers 141 are inclined from a center portion toward an outer edge of the light guide plate 140. Accordingly, a seam phenomenon which occurs at a boundary surface between related display panels is prevented. Namely, in comparison with the related art, an image is displayed through the optical fibers even at the boundary surface between the display panels, namely, at the partition wall frame region, such that an image can be reproduced continuously.

A diameter of an optical fiber 141 which is being commonly manufactured is within a range of 500~1000 μm. In case of a liquid crystal panel, lengths of a short side and a long side of a pixel defined by a gate line and a data line are about 100 μm and 200 μm, respectively, even though there are variations according to model. Also, because a section of the optical fiber has a circular shape, an image displayed through the light guide plate 140 has lower brightness than that of an image displayed at an actual display panel.

Figure 6:
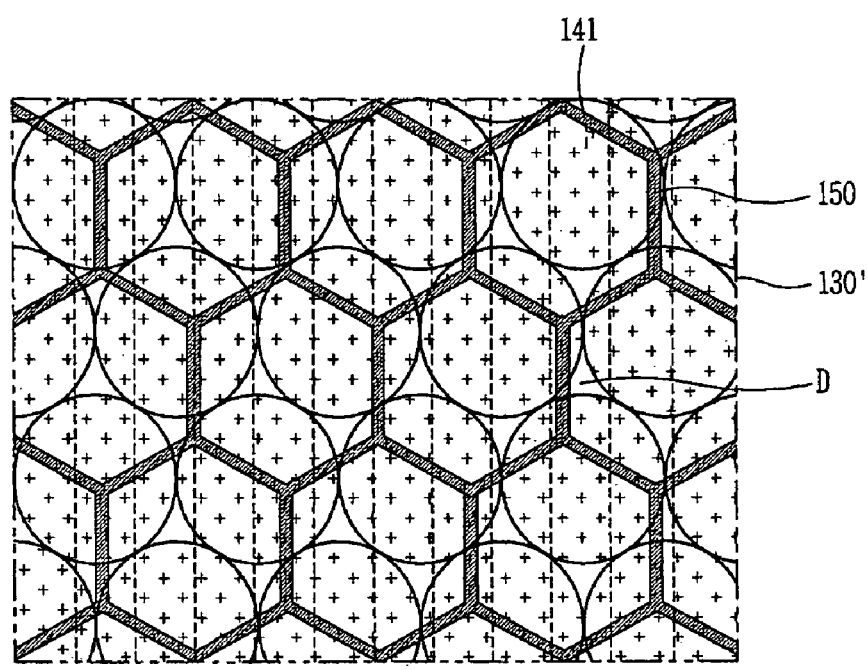
FIG. 6 is a plan view which illustrates a tiled display device in accordance with the present invention.

This will now be described in more detail with reference to the accompanying drawing. FIG. 6 is a front view of the light guide plate. As shown, the light guide plate 140 is formed as a cluster of optical fibers 141, and a diameter of the optical fiber 141 has a size enough to cover at least two pixels. Also, a BM (black matrix) film 150 is attached on the light guide plate, and the shape of the BM is formed as a regular hexagonal shape with regard to an aspect of good visibility.

Because the optical fiber 141 has a circular shape, the light guide plate 140 cannot be completely filled with optical fibers 141 and thus, a dead region (D) is generated between the optical fibers 141. Because the optical fiber 141 reproduces an image formed on a display panel, an image of a display panel 130' corresponding to the dead region (D) cannot be reproduced by the light guide plate 140.

To solve such problems, the present invention provides a tiled display device that can improve light transmittance efficiency as a pixel occupying the optical fiber is formed as large as possible (with the maximum area) and thus the dead region D is minimized.

Figure 7:
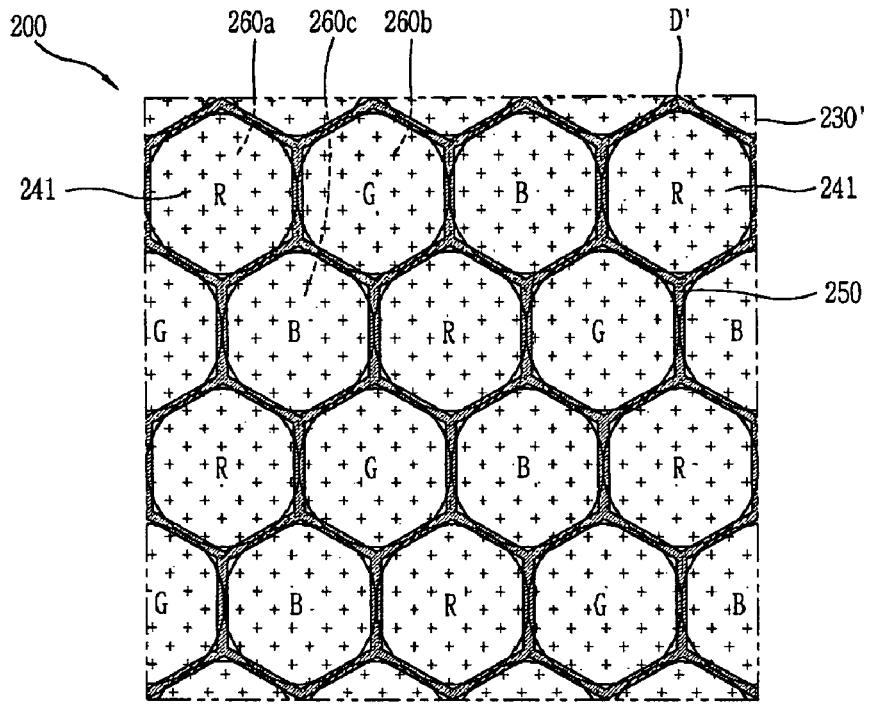
FIG. 7 is a plan view which illustrates the tiled display device in accordance with another embodiment of the present invention.

FIG. 7 is a tiled display device in accordance with the present invention devised to improve the light transmittance efficiency. Although not shown in the drawing, a structure of a frame for receiving the display panel and the light guide plate is the same as that of the previous embodiment (FIG. 4).

As shown, as for the tiled display device 200 in accordance with the present embodiment, sub-pixels 260a, 260b and 260c are designed such that one optical fiber 241 corresponds to one sub-pixel. Namely, the optical fibers 241 are matched one to one with the sub-pixels 260a, 260b and 260c, and the optical fibers 241 are respectively disposed at the R (red), G (green) and B (blue) sub-pixels 260a, 260b and 260c. Here, each of the sub-pixels 260a, 260b and 260c is formed to occupy the corresponding optical fiber 241 as large as possible (with the maximum area). In other words, because the optical fiber 241 has a circular shape, the sub-pixel 260a, 260b and 260c may also have a circular shape identical to the optical fiber 241. In general, because a diameter of the optical fiber 241 is within a range of 500~1000 μm, a size of a sub-pixel 260a, 260b and 260c varies according to the optical fiber 241 used.

Also, a BM film 250 having a BM pattern of a regular hexagonal shape may be attached to each boundary region between the optical fibers 241 (i.e., a region corresponding to a boundary region between sub-pixels) thereby improving a CR (contrast ratio). Here, the sub-pixels 260a, 260b and 260c may have a regular hexagonal shape identical to the BM pattern.

As for the case that the sub-pixels 260a, 260c and 260c are designed as a regular hexagonal shape, as shown, the optical fibers 241 are respectively disposed within the sub-pixels 260a, 260b and 260c. Here, a dead region (D') in which the optical fibers cannot cover the sub-pixels 260a, 260b and 260c is generated because the optical fiber 241 has a circular shape. However, the dead region (D') is remarkably small compared to that in the previous embodiment (refer to FIG. 6). Therefore, light transmittance efficiency may be improved.

Also, because an arrangement of the R, G and B sub-pixels 260a, 260b and 260c is identical to an arrangement of the optical fibers 241.

Figure 8:
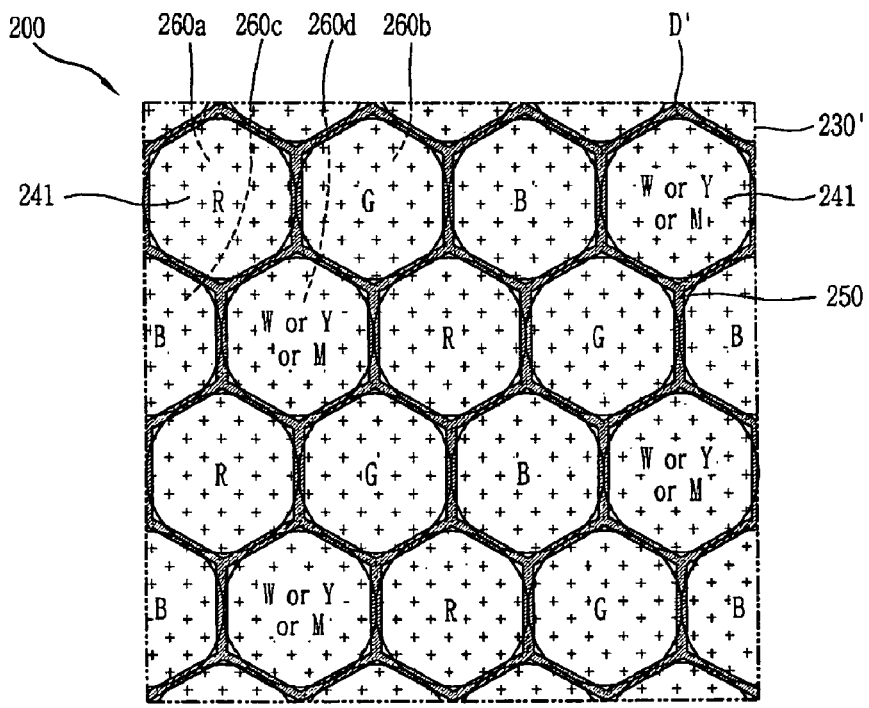
FIG. 8 is a plan view which illustrates the tiled display device in accordance with still another embodiment of the present invention.

As shown in FIG. 8, a sub-pixel 260d such as W (white), Y (yellow), M (magenta) or the like may be additionally formed to improve brightness of a display panel 230'. Here, one pixel includes R, G, B and W or Y or M 260a, 260b, 260c and 260d.

Also, to implement a high-brightness tiled display device, the four sub-pixels including the W, Y or M sub-pixel may correspond to one optical fiber in the present invention.

Figure 9:
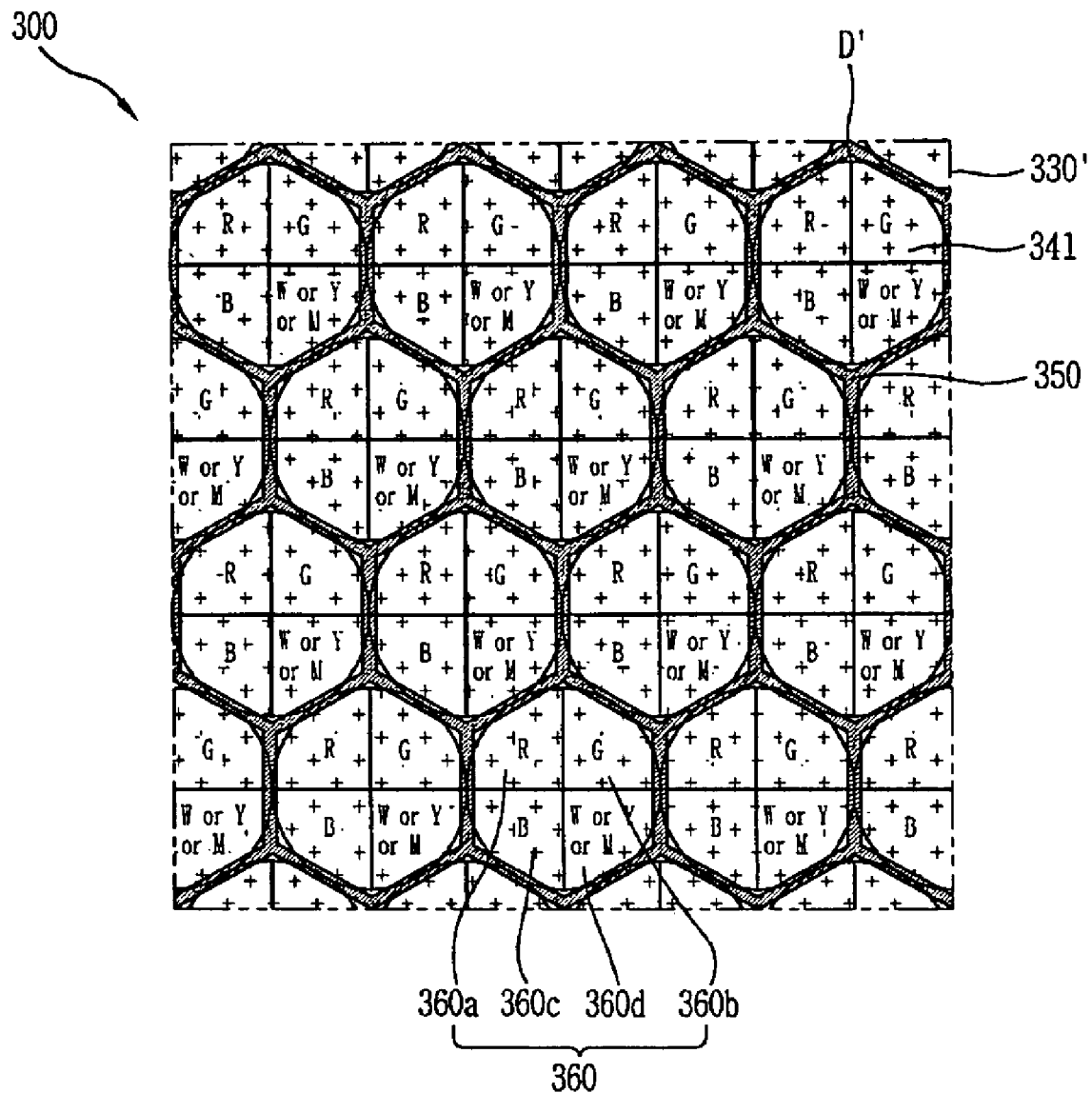
FIG. 9 is a plan view which illustrates the tiled display device in accordance with still another embodiment of the present invention.

FIG. 9 shows a high-brightness tiled display device in which one pixel 360 is disposed at one optical fiber 341 in a display panel where four sub-pixels define one pixel.

As shown, in the high-brightness tiled display device 300 in accordance with the present embodiment, one pixel 360 is disposed in one optical fiber 341. The pixel 360 includes first~fourth sub-pixels 360a~360d. The first~third substrates 360a~360c are R, G and B sub-pixels, and the fourth sub-pixel 360d may be W, Y or M sub-pixel.

Only, the first~fourth sub-pixels 360a to 360d are designed to have the same area within the optical fiber 341. Here, the pixel 360 including the first~ fourth sub-pixels 360a~360d may be designed as a regular hexagonal shape identical to a shape of a BM pattern or as a circular shape identical to a shape of the optical fiber 341.

Also, any shape of the first~ fourth sub-pixels is allowable if they have the same area within the optical fiber 341.

As described so far, the present invention can prevent a seam phenomenon occurring at a boundary surface between display panels by installing light guide plates on the display panels. Particularly, in the present invention, the light guide plate is formed of a cluster of optical fibers, and R, G and B sub-pixels defining one pixel are respectively disposed in optical fibers, thereby improving light transmittance efficiency.

Also, in the present invention, as for a high-brightness tiled display device in which W, Y or M sub-pixel is added, one unit pixel defined by a plurality of sub-pixels (e.g., four sub-pixels) may be disposed at one optical fiber. Here, if the four sub-pixels defining the pixel have the same area within the optical fiber, any shape of the sub-pixels may be allowable.

As described so far, the present invention may provide a large size display device that provides high image quality thanks to the improved light efficiency because a seam phenomenon is prevented by using a light guide plate formed of optical fibers and a pixel is designed so as to minimize a dead region generated between the optical fibers.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A large size tiled display device comprising:
   a plurality of display panels having an image display part including a plurality of pixels, each pixel including at least three sub-pixels;
   a frame having a plurality of panel receiving portions to receive the plurality of display panels;
   a light guide plate formed of a cluster of optical fibers and disposed on the display panels to reproduce an image formed on the image display part of the display panels, one optical fiber corresponding and matching to one sub-pixel; and
   a black matrix (BM) film including a BM of a regular hexagonal shape, the BM being formed at a boundary between optical fibers respectively corresponding to the sub-pixels on the light guide plate.

2. The device of claim 1, wherein the sub-pixels are first~ third sub-pixels, the first sub-pixel being a red (R) sub-pixel, the second sub-pixel being a green (G) sub-pixel, and the third sub-pixel being a blue (B) sub-pixel.

3. The device of claim 2, wherein the red, green and blue sub-pixels are arranged in a triangular arrangement.

4. The device of claim 1, wherein the sub-pixels are first~ fourth sub-pixels, the first sub-pixel being a red (R) sub-pixel, the second sub-pixel being a green (G) sub-pixel, the third sub-pixel being a blue (B) sub-pixel, and the fourth sub-pixel being a white (W) sub-pixel.

5. The device of claim 1, wherein the sub-pixels are first~ fourth sub-pixels, the first sub-pixel being a red (R) sub-pixel, the second sub-pixel being a green (G) sub-pixel, the third sub-pixel being a blue (B) sub-pixel, and the fourth sub-pixel being a yellow (Y) sub-pixel.

6. The device of claim 1, wherein the sub-pixels are first~ fourth sub-pixels, the first sub-pixel being a red (R) sub-pixel, the second sub-pixel being a green (G) sub-pixel, the third sub-pixel being a blue (B) sub-pixel, and the fourth sub-pixel being a magenta (M) sub-pixel.

7. The device of claim 1, wherein a shape of the sub-pixel is designed to maximally occupy a section of the optical fiber.

8. The device of claim 7, wherein the sub-pixel has a regular hexagonal shape.

9. The device of claim 7, wherein the sub-pixel has a circular shape.

10. The device of claim 1, wherein the sub-pixel is designed to have a shape identical to that of a section of the optical fiber, which is defined by the BM.

11. The device of claim 1, wherein the sub-pixel has a regular hexagonal shape.

12. The device of claim 1, wherein the display panel is a liquid crystal panel.

13. The device of claim 12, wherein the liquid crystal panel comprises:

first and second substrates;
gate lines and data lines arranged on the first substrate and defining sub-pixels;
a pixel electrode formed at each of the sub-pixel regions;
a switching device disposed at each intersection of the gate lines and the data lines and switching each sub-pixel;
a color filter formed on the second substrate;
a common electrode formed on the color filter; and
a liquid crystal layer formed between the first and second substrates.

14. The device of claim 1, wherein the frame comprises an outer wall frame and a partition wall frame dividing an internal space formed by the outer wall frame into individual panel receiving regions at which the plurality of display panels are mounted.

* * * * *

UNITED STATES PATENT AND TRADEMARK OFFICE
CERTIFICATE OF CORRECTION

PATENT NO. : 7,592,971 B2 Page 1 of 1
APPLICATION NO. : 11/152953
DATED : September 22, 2009
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1135 days.

Signed and Sealed this

Twenty-first Day of September, 2010

David J. Kappos
*Director of the United States Patent and Trademark Office*